United States Patent
Tang

(10) Patent No.: US 11,032,834 B2
(45) Date of Patent: Jun. 8, 2021

(54) INFORMATION TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 115 days.

(21) Appl. No.: 16/090,809

(22) PCT Filed: Jun. 20, 2016

(86) PCT No.: PCT/CN2016/086421
§ 371 (c)(1),
(2) Date: Oct. 2, 2018

(87) PCT Pub. No.: WO2017/219204
PCT Pub. Date: Dec. 28, 2017

(65) Prior Publication Data
US 2019/0098650 A1    Mar. 28, 2019

(51) Int. Cl.
*H04W 72/12*    (2009.01)
*H04L 5/00*    (2006.01)
(Continued)

(52) U.S. Cl.
CPC ....... *H04W 72/1263* (2013.01); *H04L 1/0033* (2013.01); *H04L 5/0007* (2013.01);
(Continued)

(58) Field of Classification Search
CPC . H04W 72/1263; H04W 88/00; H04W 72/12; H04L 5/0044; H04L 5/0051;
(Continued)

(56) References Cited

U.S. PATENT DOCUMENTS 8,675,766 B2    3/2014    Kwak
2010/0008333 A1    1/2010    Kim
(Continued)

FOREIGN PATENT DOCUMENTS

CN    101154980 A    4/2008
CN    101325739 A    12/2008
(Continued)

OTHER PUBLICATIONS

International Search Report in international application No. PCT/CN2016/086421, dated Mar. 1, 2017.
(Continued)

*Primary Examiner* — Justin T Van Roie
(74) *Attorney, Agent, or Firm* — Ladas & Parry, LLP

(57) ABSTRACT

An information transmission method and device, capable of transmitting reference signal and data by using different sub-carrier intervals, are provided. The method includes: a first transmitting end transmits, on a first symbol in a first time-frequency region, a first signal by using a first sub-carrier interval, the first signal being a reference signal; the first transmitting end transmits, on a second symbol in the first time-frequency region, a second signal by using a second sub-carrier interval, the second signal being a data signal or control signal, wherein the first sub-carrier interval is different from the second sub-carrier interval, and the size of the first time-frequency region is the size of the minimum time-frequency scheduling unit of the data signal.

11 Claims, 9 Drawing Sheets

(51) Int. Cl.
  *H04W 88/00* (2009.01)
  *H04L 25/03* (2006.01)
  *H04L 1/00* (2006.01)

(52) U.S. Cl.
  CPC .......... *H04L 5/0044* (2013.01); *H04L 5/0051* (2013.01); *H04L 25/03* (2013.01); *H04W 88/00* (2013.01); *H04L 5/0005* (2013.01); *H04L 5/0053* (2013.01)

(58) Field of Classification Search
  CPC ..... H04L 5/0007; H04L 25/03; H04L 1/0033; H04L 5/0053; H04L 5/0005; H04L 5/0048; H04L 5/0073
  See application file for complete search history.

(56) References Cited

U.S. PATENT DOCUMENTS

| | | | |
|---|---|---|---|
| 2011/0038398 | A1 | 2/2011 | Konno |
| 2011/0134879 | A1 | 6/2011 | Ogawa |
| 2012/0014392 | A1* | 1/2012 | Bhushan ............... H04L 5/0042 370/441 |
| 2015/0282167 | A1 | 10/2015 | Lahetkangas et al. |

FOREIGN PATENT DOCUMENTS

| | | |
|---|---|---|
| CN | 101577857 A | 11/2009 |
| CN | 102017432 A | 4/2011 |
| CN | 101132384 B | 3/2017 |
| JP | 2005150850 A | 6/2005 |
| JP | 2006504367 A | 2/2006 |
| JP | 2008505583 A | 2/2008 |
| JP | 2009273173 A | 11/2009 |
| JP | 2009539276 A | 11/2009 |
| JP | 2016027713 A | 2/2016 |
| JP | 2019057747 A | 4/2019 |
| JP | 2019516256 A | 6/2019 |
| JP | 2019517178 A | 6/2019 |
| WO | 2007082286 A2 | 7/2007 |
| WO | 2014060037 A1 | 4/2014 |
| WO | 2017164222 A1 | 9/2017 |
| WO | 2017204285 A1 | 11/2017 |

OTHER PUBLICATIONS

Written Opinion of the International Search Authority in international application No. PCT/CN2016/086421, dated Mar. 1, 2017.
Nokia et al: "Main components for forward compatible frame structure design in NR", 3GPP Draft; R1-165029, 3rd Generation Competence Centre ; 650, Route Des Lucioles ; F-86921 Sophia-Antipolis Cedex; France, vol. RAN WG1, No. Nanjing, P.R. China; May 23, 2016-May 27, 2016 May 13, 2016 (May 13, 2016), XP051096684, [retrieved on May 13, 2016] * Section 2.3, par. above Fig. 3; figure 3 *.
Intel Corporation: "Low Latency Frame Structure Design for NR", 3GPP Draft; R1-164180 Intel NR Frame Structure, 3rd Generation Partnership Project (3GPP), Mobile Competence Centre; 650, Route Des Lucioles ; F-06921 Sophia-Anti Polis Cedex ; France, vol. RAN WG1, No. Nanjing, China; May 23, 2016-May 27, 2016 May 14, 2016 (May 14, 2016), XP051096540, [retrieved on May 14, 2016] * Section 2, par. 1-6, par. below "Proposal 3 . . . "; figures 1, 2 *.
Supplementary European Search Report in the European application No. 16905746.0, dated Apr. 12, 2019.
Office Action of the Indian application No. 201817043324, dated Aug. 17, 2020.
Huawei, HiSilicon, Scenario & design criteria on flexible numerologies, 3GPP TSG-RAN WG1#84bis R1-162156, Apr. 2, 2016 (Apr. 2, 2016), pp. 1-7.
NTT Docomo, Inc., Views on domodulation RS design for NR access technology, 3GPP TSG-RAN WG1#85 R1-165178, May 14, 2016 (May 14, 2016), pp. 1-7.
MediaTek Inc., Initial link level evaluation result for NR waveform, 3GPP TSG-RAN WG1#85 R1-165161, May 14, 2016 (May 14, 2016), pp. 1-7.
ZTE, Uplink Data Channel with 15 kHz Subcarrier Spacing for NB-IoT, 3GPP TSG RAN WG1 NB-IoT Ad-Hoc Meeting R1-160053, Jan. 11, 2016 (Jan. 11, 2016), pp. 1-7.
Huawei, HiSilicon, NB-IOT—downlink physical layer concept description, 3GPP TSG-RAN WG1#83 R1-156462, Nov. 7, 2015 (Nov. 7, 2015), pp. 1-11.
First Office Action of the Japanese application No. 2018-557097, dated Sep. 29, 2020.
First Office Action of the Taiwanese application No. 106119694, dated Sep. 30, 2020.
First Office Action of the European application No. 16905746.0, dated Mar. 11, 2021.
Decision of Refusal of the Japanese application No. 2018-557097, dated Apr. 23, 2021.

* cited by examiner

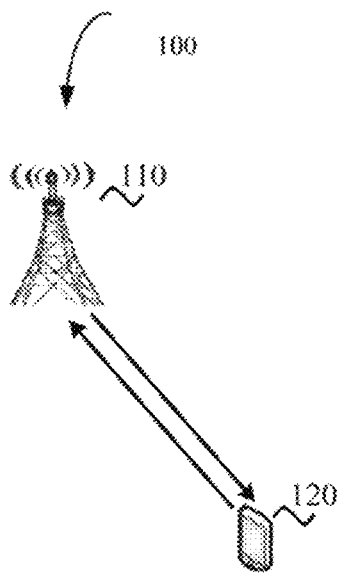

A first sender transmits first signal to a receiver via a first symbol, with a first subcarrier spacing, of a first time-frequency region, here, the first signal is reference signal — 210

The first sender transmits second signal to the receiver via a second symbol, with a second subcarrier spacing, of the first time-frequency region. Here, the second signal is data signal or control signal, and the first subcarrier spacing is different from the second subcarrier spacing, and a size of the first time-frequency region is a size of a minimum time-frequency scheduling unit of data signals — 220

FIG. 2

INFORMATION TRANSMISSION METHOD AND DEVICE

CROSS-REFERENCE TO RELATED APPLICATION

The present application is the U.S. national phase of PCT Application PCT/CN2016/086421 filed on Jun. 20, 2016, entitled "INFORMATION TRANSMISSION METHOD AND DEVICE", the disclosure of which is hereby incorporated by reference in its entirety.

TECHNICAL FIELD

The present disclosure relates to the field of communication, and more particularly to a method and device for transmitting information.

BACKGROUND

With development of networks, service requirements keep increasing and service requirement types also keep increasing. In an existing network standard communication protocol, a uniform parameter set is adopted for data transmission of a network device and a terminal device. For example, the communication protocol specifies a parameter set in a Long Term Evolution (LTE) system as follows: a radio frame is 10 ms, a radio frame includes 10 subframes, a subframe includes two time slots, a time slot includes 7 symbols, 12 continuous subcarriers on frequency and a time slot on a time domain form a Resource Block (RB), a spacing between every two subcarriers is 15 k, a subcarrier on a frequency domain and a symbol on the time domain are called a Resource Element (RE) and the like. With service diversification, adoption of a specific parameter set for data transmission may limit transmission of data of different types and further result in relatively poor communication performance.

SUMMARY

Embodiments of the present disclosure provide a method and device for transmitting information. Different subcarrier spacings may be adopted for transmission of reference signal and data, adoption of reference signal corresponding to the same subcarrier spacing for data of different subcarrier spacings may be supported, interference between reference signal may be suppressed, and channel estimation complexity may be reduced, so that communication performance is improved.

In a first aspect, there is provided a method for transmitting information, which may include that:

a first sender transmit first signal via a first symbol, with a first subcarrier spacing, of a first time-frequency region, the first signal being reference signal; and the first sender transmit second signal via a second symbol, with a second subcarrier spacing, of the first time-frequency region, the second signal being data signal or control signal, wherein the first subcarrier spacing may be different from the second subcarrier spacing, and a size of the first time-frequency region may be a size of a minimum time-frequency scheduling unit of data signal.

In such a manner, in the embodiments of the present disclosure, a size of the subcarrier spacing of the data signal or the control signal is different from the subcarrier spacing corresponding to the reference signal, so that data and the reference signal may be independently optimized respectively.

In a possible implementation, the first signal may be configured for a receiver to demodulate the second signal.

In a possible implementation, the operation that the first sender transmits the first signal via the first symbol, with the first subcarrier spacing, of the first time-frequency region may include that: the first sender transmits the first signal via the first symbol, with the first subcarrier spacing, of the first time-frequency region over a first cell;

the operation that the first sender transmits the second signal via the second symbol, with the second subcarrier spacing, of the first time-frequency region may include that: the first sender transmits the second signal via the second symbol, with the second subcarrier spacing, of the first time-frequency region over the first cell; and the information transmission method may further include that: the first sender transmits third signal via a third symbol, with the first subcarrier spacing, of a second time-frequency region over a second cell, the third signal being reference signal, and the first sender transmits fourth signal via a fourth symbol, with a third subcarrier spacing, of the second time-frequency region over the second cell, the fourth signal being data signal or control signal, wherein the second subcarrier spacing may be different from the third subcarrier spacing, and the first cell may be different from the second cell;

the first time-frequency region and the second time-frequency region may have a same time domain, have a same frequency domain, or have adjacent frequency domains; and a size of the second time-frequency region may be a size of a minimum time-frequency scheduling unit of data signal.

In such a manner, even though different subcarrier spacings are adopted for data signal or control signal of two adjacent cells, the same subcarrier spacing may also be adopted for their reference signal, so that an orthogonal or low correlation design may be adopted to avoid serious inter-subcarrier interference between reference signal for which different subcarrier spacings are adopted on adjacent or the same frequency band, and channel estimation performance is ensured.

In a possible implementation, the operation that the first sender transmits the first signal via the first symbol, with the first subcarrier spacing, of the first time-frequency region may include that: the first sender transmits the first signal via the first symbol, with the first subcarrier spacing, of the first time-frequency region over a first cell;

the operation that the first sender transmits the second signal via the second symbol, with the second subcarrier spacing, of the first time-frequency region may include that: the first sender transmits the second signal via the second symbol, with the second subcarrier spacing, of the first time-frequency region over the first cell and the information transmission method may further include that:

the first sender transmits fifth signal via a fifth symbol, with the first subcarrier spacing, of a third time-frequency region over the first cell, the fifth signal being reference signal, and the first sender transmits sixth signal via a six symbol, with a fourth subcarrier spacing, of the third time-frequency region over the first cell, the sixth signal being data signal or control signal, wherein the second subcarrier spacing may be different from the fourth subcarrier spacing;

the first time-frequency region and the third time-frequency region may have a same time domain and different frequency domains; and a size of the third time-frequency region may be a size of a minimum time-frequency scheduling unit of data signal.

In such a manner, even though different subcarrier spacings are adopted for data signal or control signal in different time-frequency regions of the same cell, the same subcarrier spacing is also adopted for their reference signal, so that the orthogonal or low correlation design may be adopted to avoid serious inter-subcarrier interference between reference signal, for which different subcarrier spacings are adopted, in adjacent time-frequency regions of the same cell, and the channel estimation performance is ensured.

In a possible implementation, the information transmission method may further include that:

a second sender transmits seventh signal via a seventh symbol, with the first subcarrier spacing, of a fourth time-frequency region, the seventh signal being reference signal; and the second sender transmits eighth signal via an eighth symbol, with a fifth subcarrier spacing, of the fourth time-frequency region, the eighth signal being data signal or control signal, wherein the first subcarrier spacing may be different from the fifth subcarrier spacing;

the first time-frequency region and the fourth time-frequency region may have a same time domain; the first time-frequency region and the fourth time-frequency region may have a same time domain, or have a same frequency domain or adjacent frequency domains, and/or the first sender and the second sender may be located in the same cell; and a size of the fourth time-frequency region may be a size of a minimum time-frequency scheduling unit of data signal or control signal.

In a possible implementation, the data signal and the control signal may correspond to different subcarrier spacings.

In a possible implementation, the information transmission method may further include that:

ninth signal is transmitted via the first symbol, with the first subcarrier spacing, of the first time-frequency region, the ninth signal being data signal or control signal.

In a possible implementation, the ninth signal and the first signal may be arranged alternately on the frequency domain.

A second aspect provides a method for transmitting information, which may include that:

a receiver receives first signal via a first symbol, with a first subcarrier spacing, of a first time-frequency region, the first signal being reference signal; and the receiver receives second signal via a second symbol, with a second subcarrier spacing, of the first time-frequency region, the second signal being data signal or control signal, wherein the first subcarrier spacing may be different from the second subcarrier spacing, and a size of the first time-frequency region may be a size of a minimum time-frequency scheduling unit of data signal or control signal.

In a possible implementation, the information transmission method may further include that:

the receiver uses the first signal to demodulate the second signal.

In a possible implementation, the operation that the receiver receives the first signal via the first symbol, with the first subcarrier spacing, of the first time-frequency region may include that: the receiver receives the first signal via the first symbol, with the first subcarrier spacing, of the first time-frequency region over a first cell;

the operation that the receiver receives the second signal via the second symbol, with the second subcarrier spacing, of the first time-frequency region may include that: the receiver receives the second signal via the second symbol, with the second subcarrier spacing, of the first time-frequency region over the first cell; and the information transmission method may further include that: the receiver receives third signal via a third symbol, with the first subcarrier spacing, of a second time-frequency region over a second cell, the third signal being reference signal, and the receiver receives fourth signal via a fourth symbol, with a third subcarrier spacing, of the second time-frequency region over the second cell, the fourth signal being data signal or control signal, wherein the second subcarrier spacing may be different from the third subcarrier spacing, and the first cell may be different from the second cell;

the first time-frequency region and the second time-frequency region may have a same time domain, have a same frequency domain, or have adjacent frequency domains; and a size of the second time-frequency region may be a size of a minimum time-frequency scheduling unit of data signal or control signal.

In a possible implementation, the operation that the receiver receives the first signal via the first symbol, with the first subcarrier spacing, of the first time-frequency region may include that: the receiver receives the first signal via the first symbol, with the first subcarrier spacing, of the first time-frequency region over a first cell;

the operation that the receiver receives the second signal via the second symbol, with the second subcarrier spacing, of the first time-frequency region may include that: the receiver receives the second signal via the second symbol, with the second subcarrier spacing, of the first time-frequency region over the first cell; and the information transmission method may further include that:

the receiver receives fifth signal via a fifth symbol, with the first subcarrier spacing, of a third time-frequency region over the first cell, the fifth signal being reference signal, and the receiver receives sixth signal via a sixth symbol, with a fourth subcarrier spacing, of the third time-frequency region over the first cell, the sixth signal being data signal or control signal, wherein the second subcarrier spacing may be different from the fourth subcarrier spacing;

the first time-frequency region and the third time-frequency region may have a same time domain and different frequency domains; and a size of the third time-frequency region may be a size of a minimum time-frequency scheduling unit of data signal or control signal.

A third aspect provides a device for transmitting information, which is configured to execute the method in the first aspect or any optional implementation of the first aspect. Specifically, the information transmission device includes module units configured to execute the method in the first aspect or any possible implementation of the first aspect.

A fourth aspect provides a device for transmitting information, which is configured to execute the method in the second aspect or any optional implementation of the second aspect. Specifically, the information transmission device includes module units configured to execute the method in the second aspect or any possible implementation of the second aspect.

A fifth aspect provides a device for transmitting information, which includes a memory and a processor, wherein the memory is configured to store an instruction, the processor is configured to execute the instruction stored in the memory, and when the processor executes the instruction stored in the memory, such execution enables the processor to execute the method in the first aspect or any optional implementation of the first aspect.

A sixth aspect provides a device for transmitting information, which includes a memory and a processor, wherein the memory is configured to store an instruction, the processor is configured to execute the instruction stored in the memory, and when the processor executes the instruction stored in the memory, such execution enables the processor to execute the method in the second aspect or any optional implementation of the second aspect.

A seventh aspect provides a computer storage medium, in which a program code is stored, the program code being configured to indicate the method in the first aspect or any optional implementation of the first aspect to be executed.

An eighth aspect provides a computer storage medium, in which a program code is stored, the program code being configured to indicate the method in the second aspect or any optional implementation of the second aspect to be executed.

BRIEF DESCRIPTION OF DRAWINGS

In order to describe the technical solutions of the embodiments of the present disclosure more clearly, the drawings required to be used in descriptions about the embodiments or a conventional art will be simply introduced below. It is apparent that the drawings described below are only some embodiments of the present disclosure. Other drawings may further be obtained by those of ordinary skill in the art according to these drawings without creative work.

FIG. 1 is a diagram of an application scenario according to an embodiment of the present disclosure.

FIG. 2 is a schematic flowchart of a method for transmitting information according to an embodiment of the present disclosure.

DETAILED DESCRIPTION

Figure 3:
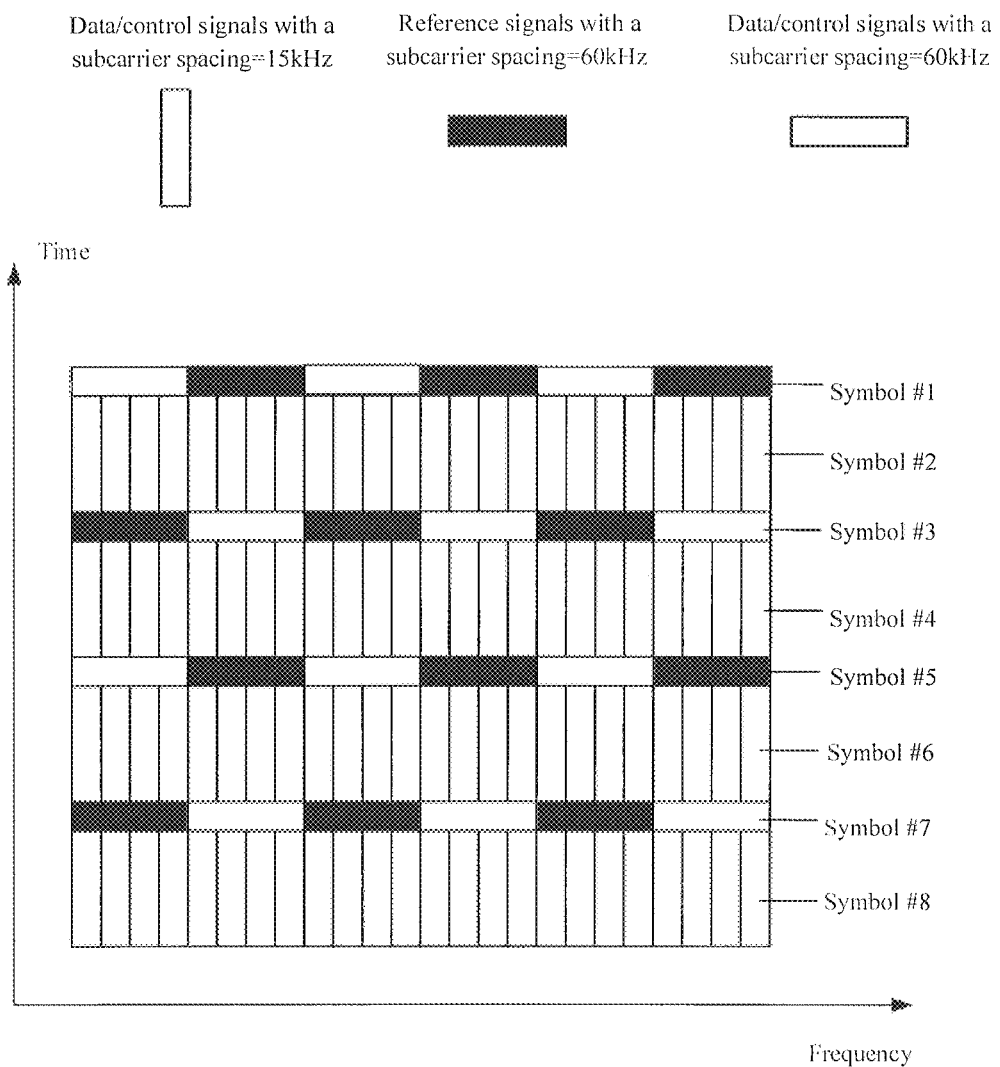
FIG. 3 is a diagram showing usage of a time-frequency resource according to an embodiment of the present disclosure.

The technical solutions in the embodiments of the present disclosure will be clearly and completely described below in conjunction with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

It is to be understood that the technical solutions of the embodiments of the present disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), an LTE system, a Universal Mobile Telecommunication System (UMTS) and the like, and are particularly applied to a future 5th-Generation (5G) system.

In the embodiments of the present disclosure, a terminal device may also refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a hand-held device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the present disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like.

FIG. 1 is a schematic diagram of an application scenario according to the present disclosure. A communication system 100 in FIG. 1 may include a network device 110 and a terminal device 120. The network device 110 is configured to provide communication service for the terminal device 120 for access to a core network. The terminal device 120 searches a synchronization signal, broadcast signal and the like sent by the network device 110 to access the network, thereby communicating with the network. Arrows illustrated in FIG. 1 may represent uplink/downlink transmission implemented through a cellular link between the terminal device 120 and the network device 110. In the embodiments of the present disclosure, the network device 110 may be a sender or a receiver and the terminal device may be a sender or a receiver.

In the embodiments of the present disclosure, a subcarrier spacing and symbol length adopted for signal transmission form an inversely proportional relationship T=1/Δf, where T is the symbol length and Δf is the subcarrier spacing. For example, if the subcarrier spacing is 15 kHZ, the symbol length is 66.67 μs. The subcarrier spacing mentioned in the embodiments of the present disclosure may be, but not limited to, 15 kHZ, 30 kHZ and 60 kHZ.

FIG. 2 is a schematic flowchart of a method for transmitting information 200 according to an embodiment of the present disclosure. FIG. 2 illustrates acts or operations of the information transmission method. However, these acts or operations are only examples. Other operations or transformations of each operation in FIG. 2 may also be executed in the embodiment of the disclosure.

In 210, a first sender transmits first signal to a receiver via a first symbol, with a first subcarrier spacing, of a first time-frequency region. Here, the first signal is reference signal.

In 220, the first sender transmits second signal to the receiver via a second symbol, with a second subcarrier spacing, of the first time-frequency region. Here, the second signal is reference signal. The first subcarrier spacing is different from the second subcarrier spacing. A size of the first time-frequency region is a size of a minimum time-frequency scheduling unit of data signal. Optionally, the first signal may be configured for the receiver to demodulate the second signal.

For example, in a time-frequency region illustrated in FIG. 3, a subcarrier spacing 60 kHZ may be used to send reference signals on a symbol #1, a symbol #3, a symbol #5 and a symbol #7 and a subcarrier spacing 15 kHZ may be used to send data signals or control signals on a symbol #2, a symbol #4, a symbol #6 and a symbol #8.

It is to be understood that the minimum time-frequency scheduling unit mentioned in the embodiment of the present disclosure is a minimum time-frequency scheduling unit (for example, a subframe) of data, i.e., fewest time-frequency resources occupied by data sent by a user at one time. Data signal, reference signal and control signaling may be transmitted in the time-frequency scheduling unit.

Figure 4:
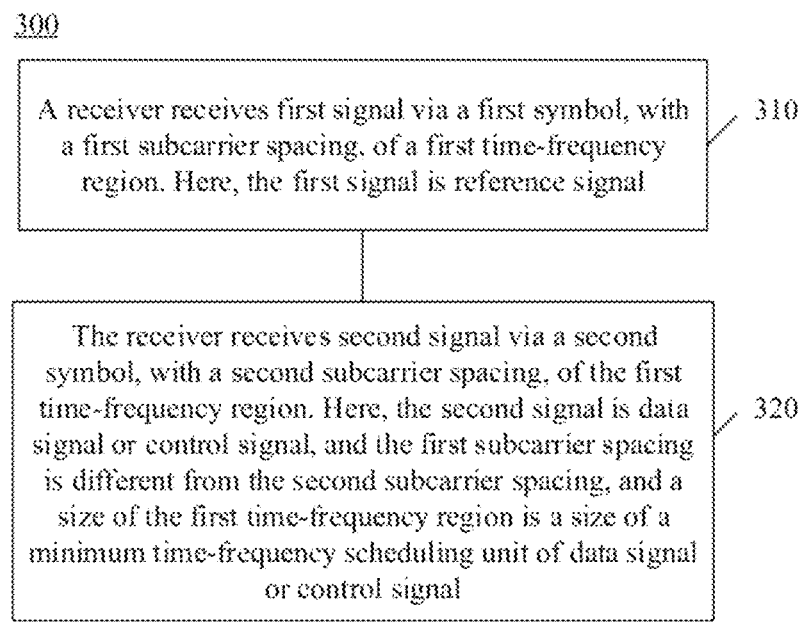
FIG. 4 is a schematic flowchart of a method for transmitting information according to an embodiment of the present disclosure.

Correspondingly, FIG. 4 is a schematic flowchart of a method for transmitting information 300 executed by a receiver according to an embodiment of the disclosure. It is to be understood that FIG. 4 illustrates acts or operations of the information transmission method. However, these acts or operations are only examples. Other operations or transformations of each operation in FIG. 3 may also be executed in the embodiment of the disclosure.

In 310, the receiver receives first signal via a first symbol, with a first subcarrier spacing, of a first time-frequency region. Here, the first signal is reference signal.

The receiver receives second signal via a second symbol, with a second subcarrier spacing, of the first time-frequency region. Here, the second signal is reference signal. The first subcarrier spacing is different from the second subcarrier spacing. A size of the first time-frequency region is a size of a minimum time-frequency scheduling unit of data signal or control signal.

Optionally, the receiver, after receiving the first signal and/or the second signal, may perform subsequent processing, for example, using the first signal to demodulate the second signal. There are no limits made to specific processing operations in the embodiment of the present disclosure.

The time-frequency scheduling unit mentioned in the embodiment of the present disclosure may be divided into a time-domain scheduling unit in a time-domain dimension and a frequency-domain unit in a frequency-domain dimension.

For example, for data signal, the time-domain scheduling unit may be a time slot, a subframe or a Transmission Time Interval (TTI). For control signal, the time-domain scheduling unit may be a symbol. For data signal, the frequency-domain scheduling unit may be a subcarrier. For control signal, the frequency-domain scheduling unit may be a Resource Element Group (REG).

The time-frequency scheduling unit mentioned in the embodiment of the present disclosure may also be limited in both time/frequency-domain dimensions. For example, for data signal, the minimum time-frequency scheduling unit may be an RB. An RB may be 1 subframe x12 subcarriers.

It is to be understood that the abovementioned division manner for the time-domain scheduling unit, frequency-domain scheduling unit or time/frequency-domain scheduling unit is only a specific implementation of the embodiment of the present disclosure. Another division manner may also be adopted in the embodiment of the present disclosure.

In such a manner, in the embodiment of the present disclosure, a size of a minimum time-frequency scheduling unit of data signal or control signal is different from the subcarrier spacing corresponding to the reference signal, so that a flexible subcarrier spacing design is achieved.

Specifically, since the subcarrier spacing corresponding to the reference signal may be different from the subcarrier spacing corresponding to the data signal or the control signal, the subcarrier spacing corresponding to the reference signal may be increased at the same time of maintaining the subcarrier spacing corresponding to the data signal or the control signal to accordingly shorten a channel estimation delay. For example, a symbol length of a reference signal corresponding to a 60 kHz subcarrier spacing is ¼ of a symbol length of a reference signal corresponding to a 15 kHz subcarrier spacing, and a receiver may start channel estimation 50 μs earlier. For a service focused on low delay performance, this is an apparent advantage. Even for an ordinary Transmission Control Protocol (TCP) service, a throughput may also indirectly be improved. A relatively long subcarrier spacing such as 60 kHz mainly has the shortcomings that a Cyclic Prefix (CP) overhead is excessively high, a relatively long CP is required to be inserted in a macro cell coverage scenario and adoption of a relatively long subcarrier spacing for all data transmission may bring great loss to spectrum efficiency. However, a reference signal only occupies a small number of symbols, so that spectrum efficiency loss will be not so huge, but a quite obvious gain is brought by delay shortening.

Optionally, in the embodiment of the present disclosure, for different terminals, or different cells or different frequency bands, subcarrier spacings for corresponding reference signal may be the same but subcarrier spacings for corresponding data signal or control signal may be different.

Figure 5:
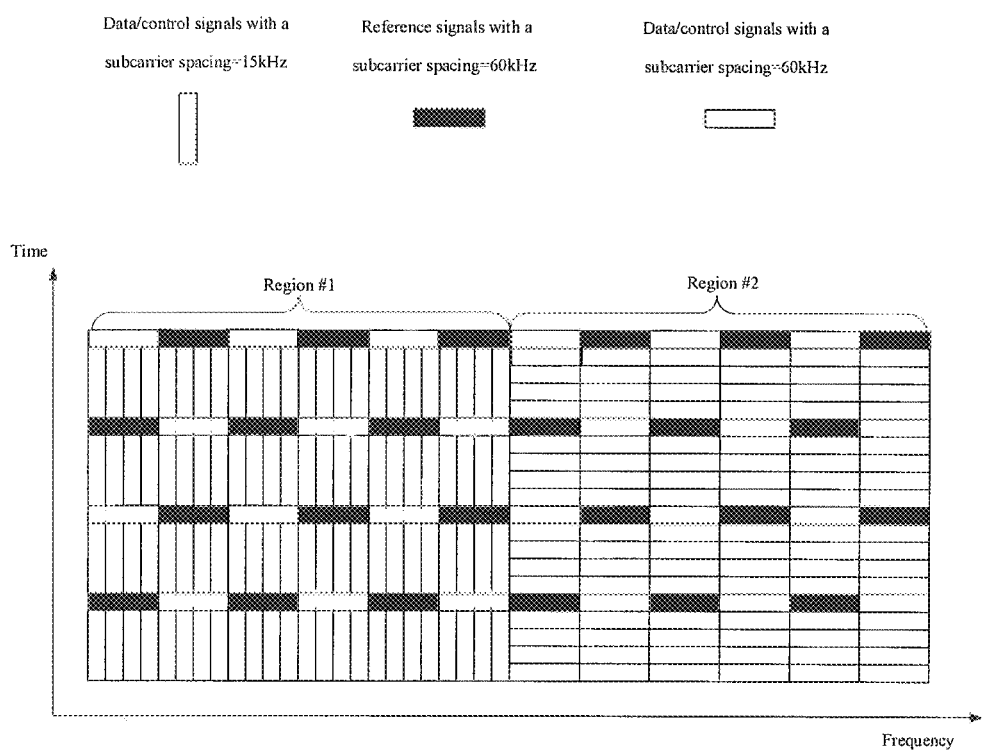
FIG. 5 is a diagram showing usage of a time-frequency resource according to an embodiment of the present disclosure.

For example, as illustrated in FIG. 5, regions #1 and #2 correspond to the same time domain and adjacent frequency domains, subcarrier spacings of symbols configured to send reference signal in the region #1 and the region #2 are the same and subcarrier spacings of symbols where non-reference signal in the region #1 and the region #2 are located are different.

Figure 6:
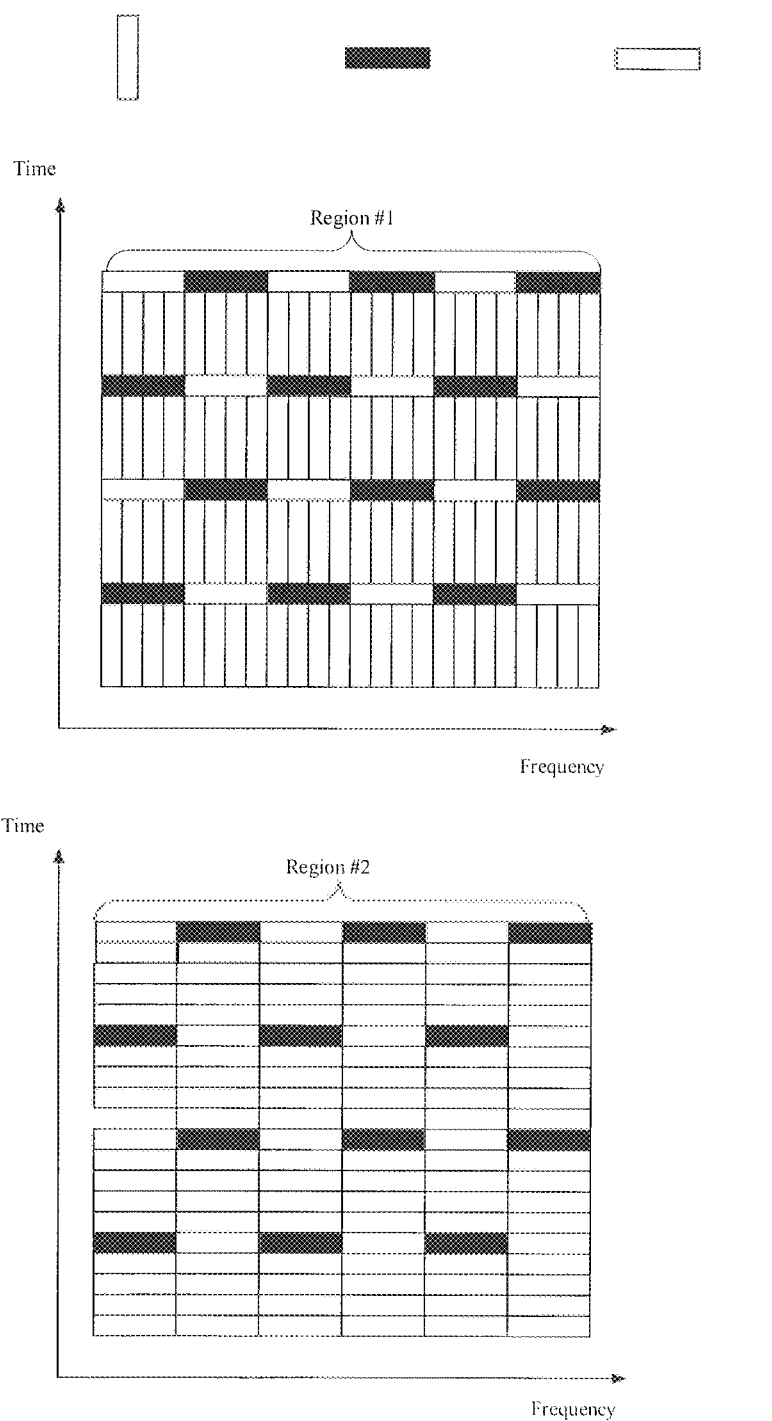
FIG. 6 is a diagram showing usage of a time-frequency resource according to an embodiment of the present disclosure.

For example, as illustrated in FIG. 6, regions #1 and #2 correspond to the same time domain and frequency domain but correspond to different cells or terminal devices, subcarrier spacings of symbols configured to send reference signal in the region #1 and the region #2 are the same and subcarrier spacings of symbols where non-reference signal in the region #1 and the region #2 are different.

Optionally, time-frequency shapes of resource particles occupied by reference signals with the same subcarrier spacing in the embodiment of the present disclosure are the same.

In such a manner, in the embodiment of the present disclosure, for multiple terminals, or multiple cells or multiple frequency bands adopting different subcarrier spacings for data transmission, only one reference signal pattern type may be designed, and a transmitter and a receiver may implement a uniform reference signal sending and channel estimation algorithm, so that complexity of standards and devices is greatly reduced, corresponding control signaling notifying a reference signal type is also greatly simplified, and an overhead is greatly reduced.

Optionally, an orthogonal or low correlation sequence may be adopted for reference signals with the same subcarrier spacing.

For example, subcarrier spacings of data signals (or control signals) sent by a network device by using two cells on symbols occupied by non-reference signals are different, subcarrier spacings of reference signals on the same antenna port are the same and time-frequency shapes of resource particles occupied by the reference signals are the same. Optionally, an orthogonal or low correlation sequence is adopted for the reference signals of the two cells on the same antenna port.

It is to be understood that a terminal device corresponding to the time-frequency region mentioned in the embodiment of the present disclosure refers to a terminal device using the time-frequency resource to send signal. A cell corresponding to the time-frequency region mentioned in the embodiment of the present disclosure refers to a cell adopted when information is sent in the time-frequency region, may be applied to uplink and may also be applied to downlink.

For convenient understanding, detailed descriptions will be made below in conjunction with FIG. 7 to FIG. 9.

It is to be understood that, in various embodiments of the present disclosure, a magnitude of a sequence number of each process does not mean an execution sequence and the execution sequence of each process should be determined by its function and an internal logic and should not form any limit to an implementation process of the embodiments of the present disclosure.

It is also to be understood that there is a corresponding receiving operation of the receiver for each sending operation of the sender in the embodiment of the present disclosure. Elaborations are omitted herein for simplicity.

Figure 7:
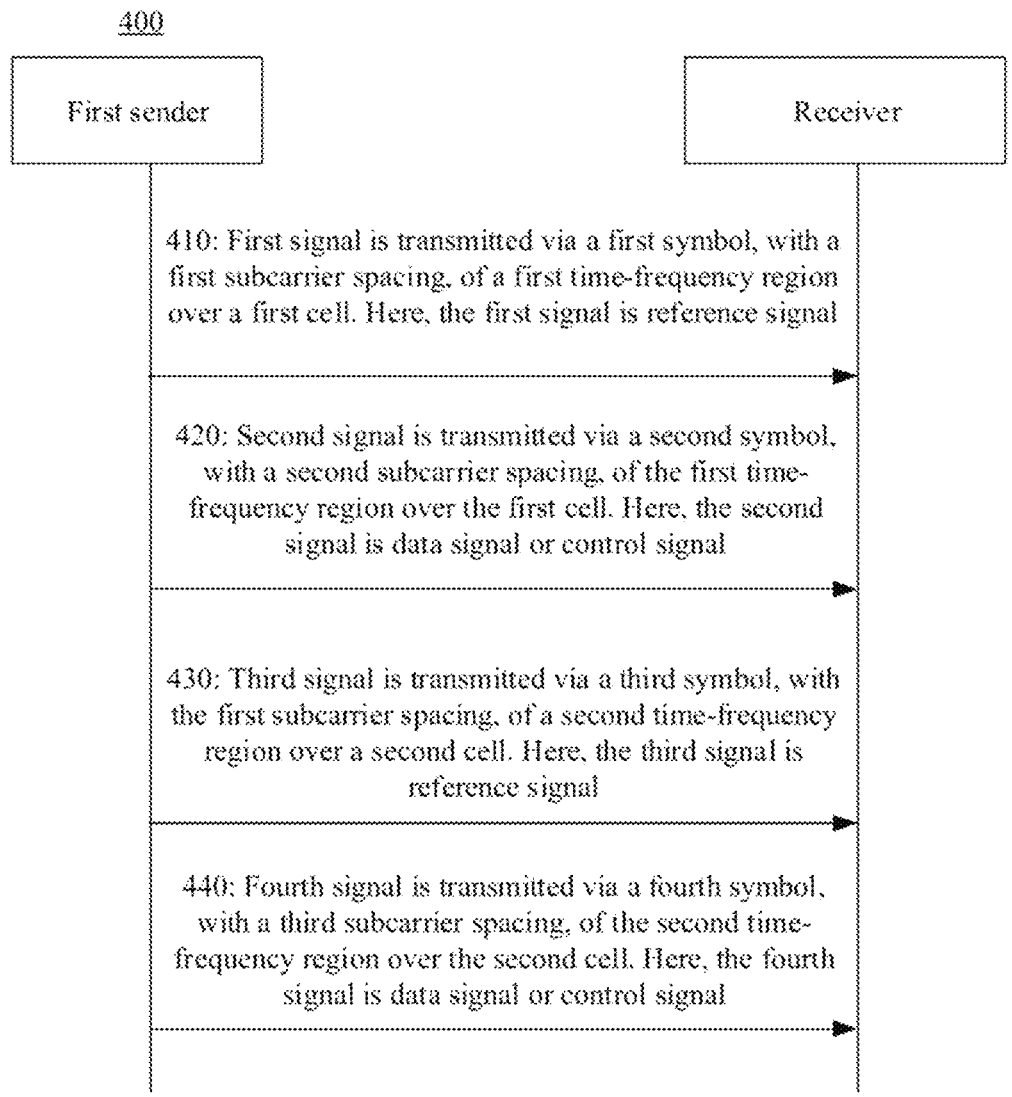
FIG. 7 is a schematic flowchart of a method for transmitting information according to an embodiment of the present disclosure.

FIG. 7 is a schematic flowchart of a method for transmitting information 400 according to an embodiment of the present disclosure. A first time-frequency region and second time-frequency region illustrated in FIG. 7 have a same time domain, have a same frequency domain, or have adjacent frequency domains. Sizes of the first and second time-frequency regions are a size of a minimum time-frequency scheduling unit of data signal. A second subcarrier spacing is different from a third subcarrier spacing.

Optionally, the method may be applied to downlink transmission. In such case, a first sender may be a network device and a receiver may be a terminal device. Receivers corresponding to different time-frequency regions may be the same terminal device and may also be different terminal devices.

Of course, the method may also be applied to uplink transmission. In such case, the sender is a terminal device and the receiver is a network device. Receivers corresponding to different time-frequency regions may be the same network device and may also be different network devices.

In 410, the first sender transmits first signal via a first symbol, with a first subcarrier spacing, of a first time-frequency region over a first cell. Here, the first signal is reference signal.

Correspondingly, the receiver receives the first signal via the first symbol, with the first subcarrier spacing, of the first time-frequency region over the first cell.

In 420, the first sender transmits second signal via a second symbol, with a second subcarrier spacing, of the first time-frequency region over the first cell. The second signal is data signal or control signal.

Correspondingly, the receiver receives the second signal via the second symbol, with the second subcarrier spacing, of the first time-frequency region over the first cell.

In 430, the first sender transmits third signal via a third symbol, with the first subcarrier spacing, of a second time-frequency region over a second cell. The third signal is reference signal.

Correspondingly, the receiver receives the third signal via the third symbol, with the first subcarrier spacing, of the second time-frequency region over the second cell.

In 440, the first sender transmits fourth signal via a fourth symbol, with a third subcarrier spacing, of the second time-frequency region over the second cell. The fourth signal is data signal or control signal.

Correspondingly, the receiver receives the fourth signal via the fourth symbol, with the third subcarrier spacing, of the second time-frequency region over the second cell.

In such a manner, in the embodiment of the present disclosure, even though different subcarrier spacings are adopted for data signal or control signal of the same frequency band or adjacent frequency bands, the same subcarrier spacing may also be adopted for reference signal, so that an orthogonal or low correlation design may be adopted to avoid serious inter-subcarrier interference probably formed between reference signal for which different subcarrier spacings are adopted on adjacent or the same frequency band may be avoided, and channel estimation performance is ensured.

Figure 8:
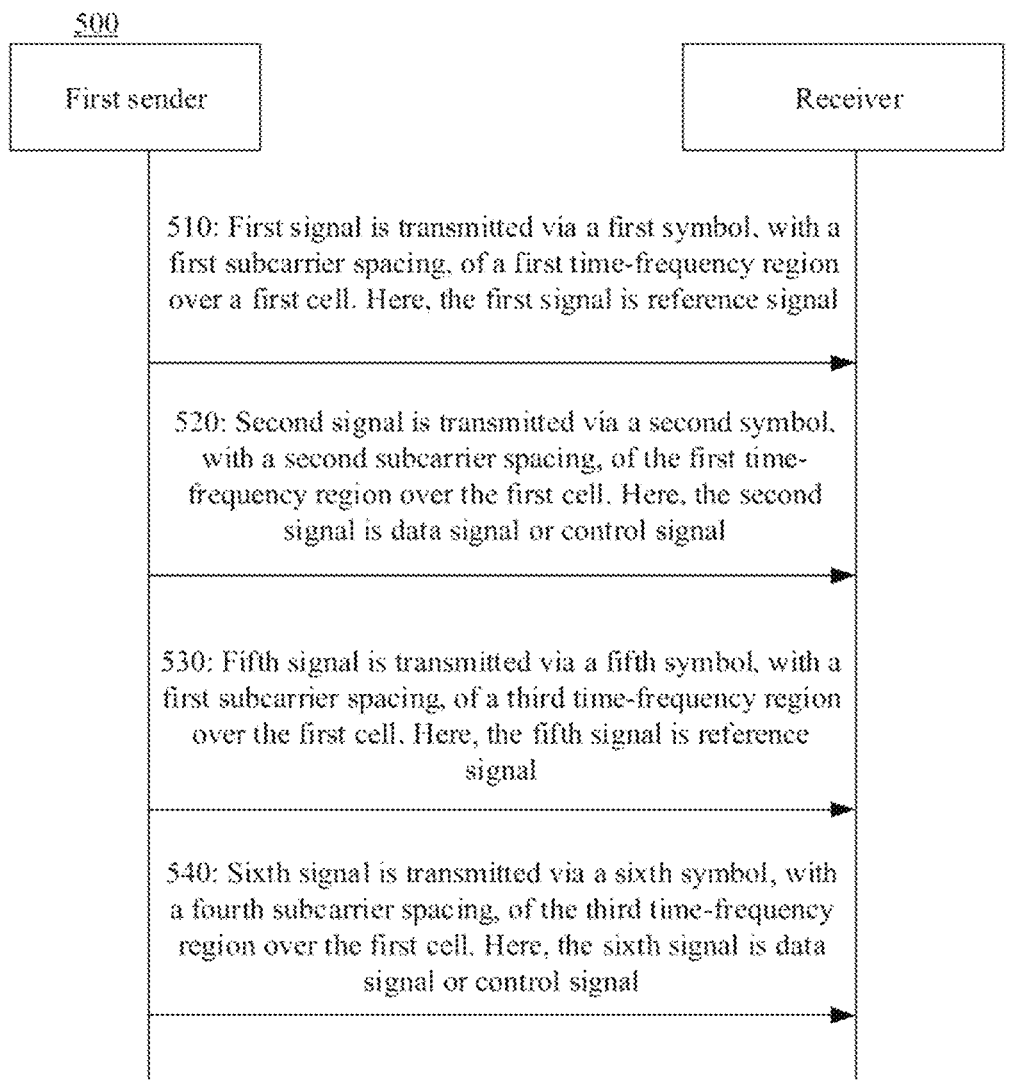
FIG. 8 is a schematic flowchart of a method for transmitting information according to an embodiment of the present disclosure.

FIG. 8 is a schematic flowchart of a method for transmitting information 500 according to an embodiment of the present disclosure. A first time-frequency region and third time-frequency region illustrated in FIG. 8 have a same time domain and different frequency domains. Sizes of the first and third time-frequency regions are a size of a minimum time-frequency scheduling unit of data signal. A second subcarrier spacing is different from a fourth subcarrier spacing.

Optionally, the method may be applied to downlink transmission. In such case, a first sender may be a network device and a receiver may be a terminal device. Receivers corresponding to different time-frequency regions may be the same terminal device and may also be different terminal devices.

Of course, the method may also be applied to uplink transmission. In such case, the sender is a terminal device and the receiver may be a network device.

In 510, the first sender transmits first signal via a first symbol, with a first subcarrier spacing, of a first time-frequency region over a first cell. Here, the first signal is reference signal.

Correspondingly, the receiver receives the first signal via the first symbol, with the first subcarrier spacing, of the first time-frequency region over the first cell.

In 520, the first sender transmits second signal via a second symbol, with a second subcarrier spacing, of the first time-frequency region over the first cell. The second signal is data signal or control signal.

Correspondingly, the receiver receives the second signal via the second symbol, with the second subcarrier spacing, of the first time-frequency region over the first cell.

In 530, the first sender transmits fifth signal via a fifth symbol, with the first subcarrier spacing, of a third time-frequency region over the first cell. The fifth signal is reference signal.

Correspondingly, the receiver receives the fifth signal via the fifth symbol, with the first subcarrier spacing, of the third time-frequency region over the first cell In 540, the first sender transmits sixth signal via a six symbol, with a fourth subcarrier spacing, of the third time-frequency region over the first cell. The sixth signal is data signal or control signal. Optionally, the fifth signal is configured for the receiver to demodulate the sixth signal.

Correspondingly, the receiver receives sixth signal via the sixth symbol, with the fourth subcarrier spacing, of the third time-frequency region over the first cell.

In such a manner, in the embodiment of the present disclosure, even though different subcarrier spacings are adopted for data signal or control signal of the same cell, the same subcarrier spacing is also adopted for reference signal, so that serious inter-subcarrier interference probably formed between reference signal for which different subcarrier spacings are adopted in the same cell may be avoided, and channel estimation performance is ensured.

Figure 9:
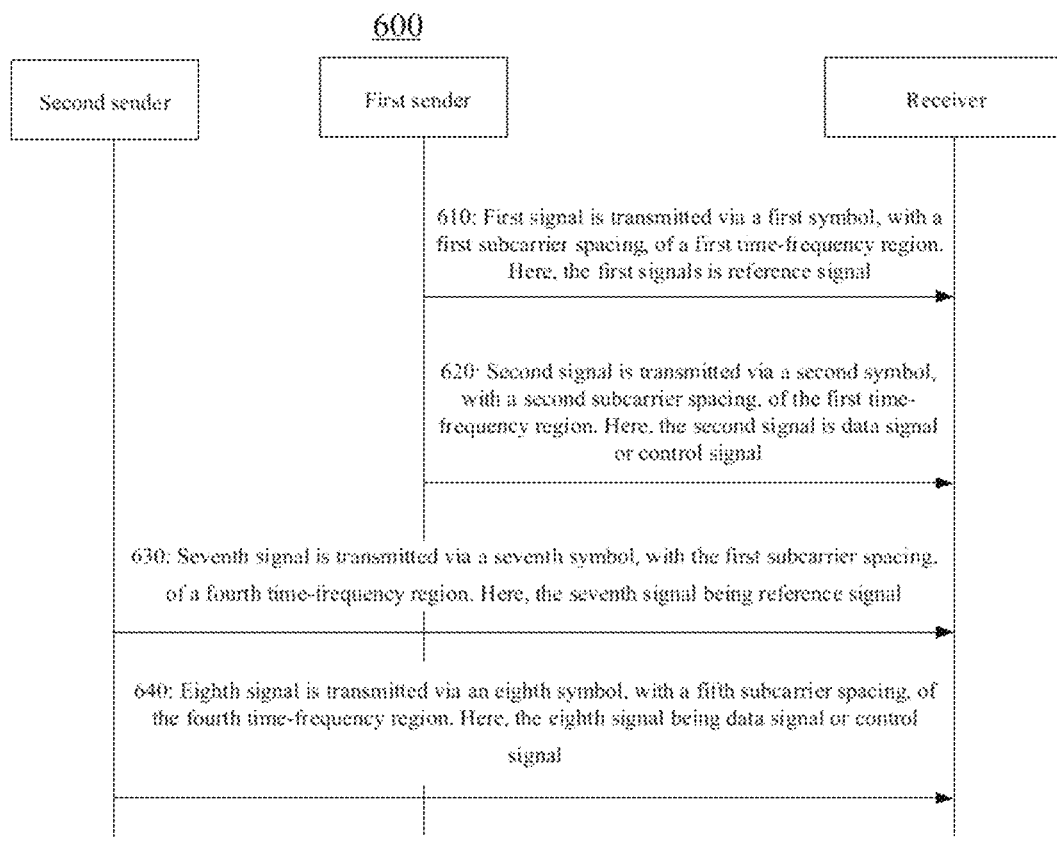
FIG. 9 is a schematic flowchart of a method for transmitting information according to an embodiment of the present disclosure.

FIG. 9 is a schematic flowchart of a method for transmitting information 600 according to an embodiment of the present disclosure. A first time-frequency region and fourth time-frequency region illustrated in FIG. 9 have a same time domain. The first time-frequency region and the fourth time-frequency region have a same time domain, or have a same frequency domain or adjacent frequency domains. and/or a first sender and a second sender are located in a same cell. Sizes of the first and fourth time-frequency regions are a size of a minimum time-frequency scheduling unit of data signal. A second subcarrier spacing is different from a fifth subcarrier spacing.

Optionally, the method may be applied to uplink transmission. During application to uplink transmission, the first sender and the second sender may be located in the same cell or the first time-frequency region where the first sender sends signal and the fourth time-frequency region where the second sender sends information are the same or adjacent in time and frequency.

Optionally, the method may be applied to downlink transmission. In such case, the first time-frequency region where the first sender sends signal and the fourth time-frequency region where the second sender sends information are the same or adjacent in time and frequency. In such case, the first sender and the second sender may correspond to different cells.

In 610, the first sender transmits first signal via a first symbol, with a first subcarrier spacing, of a first time-frequency region. Here, the first signal is reference signal.

Correspondingly, the receiver receives the first signal via the first symbol, with the first subcarrier spacing, of the first time-frequency region.

In 620, the first sender transmits second signal via a second symbol, with a second subcarrier spacing, of the first time-frequency region. The second signal is data signal or control signal.

Correspondingly, the receiver receives the second signal via the second symbol, with the second subcarrier spacing, of the first time-frequency region.

In 630, the first sender transmits seventh signal via a seventh symbol, with the first subcarrier spacing, of a fourth time-frequency region, the seventh signal being reference signal.

Correspondingly, the receiver receives the seventh signal via the seventh symbol, with the first subcarrier spacing, of the fourth time-frequency region.

In 640, the second sender transmits eighth signal via an eighth symbol, with a fifth subcarrier spacing, of the fourth time-frequency region, the eighth signal being data signal or control signal. Optionally, the seventh signal is configured for the receiver to demodulate the eighth signal.

Correspondingly, the receiver receives the eighth signal via the eighth symbol, with the fifth subcarrier spacing, of the fourth time-frequency region.

Optionally, in the embodiment of the present disclosure, the data signal or the control signal may also be sent on the symbol sending the reference signal. Optionally, the data signal or the control signal may be arranged alternately with the reference signal.

For example, in a time-frequency region illustrated in FIG. 3, a subcarrier spacing 60 kHZ may be used to send data signals or control signals on a symbol #1, a symbol #3, a symbol #5 and a symbol #7. The sent data signals or control signals may be arranged alternately with the reference signals on a frequency domain.

It is to be understood that alternately arrangement mentioned in the embodiment of the present disclosure does not always refer to one-to-one sequential alternately arrangement and may be determined according to a magnitude relationship between the signal number of the reference signals and the signal number of the data signals (or the control signals). For example, on a certain symbol, reference signals on a first subcarrier, data or control signals are sent on a second, third and fourth subcarriers, reference signals are sent on a fifth subcarrier, data or control signals are sent on a sixth, seventh and eighth subcarriers, and so on.

Figure 10:
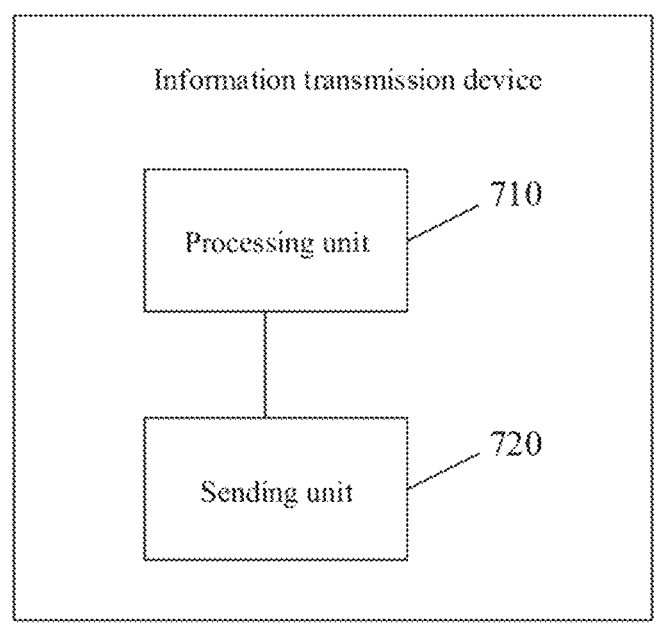
FIG. 10 is a schematic flowchart of a device for transmitting information according to an embodiment of the present disclosure.

FIG. 10 is a schematic block diagram of a device for transmitting information 700 according to an embodiment of the present disclosure. As illustrated in FIG. 10, the device 700 includes a processing unit 710 and a sending unit 720. The processing unit 710 is configured to acquire first signal and second signal, the first signal being reference signal and the second signal being data signal or control signal. The sending unit 720 is configured to transmit the first signal via a first symbol, with a first subcarrier spacing, of a first time-frequency region and transmit the second signal via a second symbol, with a second subcarrier spacing, of the first time-frequency region. The first subcarrier spacing is different from the second subcarrier spacing. A size of the first time-frequency region is a size of a minimum time-frequency scheduling unit of data signal.

Optionally, the first signal is configured for a receiver to demodulate the second signal.

Optionally, the processing unit 710 is further configured to acquire third signal and fourth signal, the third signal being reference signal and the fourth signal being data signal or control signal. The sending unit 720 is further configured to transmit the first signal via the first symbol, with the first subcarrier spacing, of the first time-frequency region over a first cell, transmit the second signal via the second symbol, with the second subcarrier spacing, of the first time-frequency region over the first cell, transmit the third signal via a third symbol, with the first subcarrier spacing, of a second time-frequency region over a second cell and transmit the fourth signal via a fourth symbol, with a third subcarrier spacing, of the second time-frequency domain over the second cell. The second subcarrier spacing is different from the third subcarrier spacing and the first cell is different from the second cell. The first time-frequency region and the second time-frequency region have a same time domain, have a same frequency domain, or have adjacent frequency domains. A size of the second time-frequency region is a size of a minimum time-frequency scheduling unit of data signal.

Optionally, the processing unit 710 is further configured to acquire fifth signal and sixth signal, the fifth signal being reference signal and the sixth signal being data signal or control signal. The sending unit 720 is further configured to transmit the first signal via the first symbol, with the first subcarrier spacing, of the first time-frequency region over the first cell, transmit the second signal via the second symbol, with the second subcarrier spacing, of the first time-frequency region over the first cell, transmit the fifth signal via a fifth symbol, with the first subcarrier spacing, of a third time-frequency region over the first cell and transmit the sixth signal via a sixth symbol, with a fourth subcarrier spacing, of the third time-frequency region over the first cell. The second subcarrier spacing is different from the fourth subcarrier spacing. The first time-frequency region and the third time-frequency region have a same time domain and different frequency domains. A size of the third time-frequency region is a size of a minimum time-frequency scheduling unit of data signal.

Optionally, the subcarrier spacing for the data signal is different from the subcarrier spacing for the control signal.

Optionally, the processing unit 710 is further configured to acquire ninth signal, the ninth signal being data signal or control signal. The sending unit is further configured to send the ninth signal through the first subcarrier spacing on the first symbol in the first time-frequency region.

The device 700 may correspond to the sender in the abovementioned method embodiment, may implement corresponding operations of the sender and will not be elaborated herein for simplicity.

Figure 11:
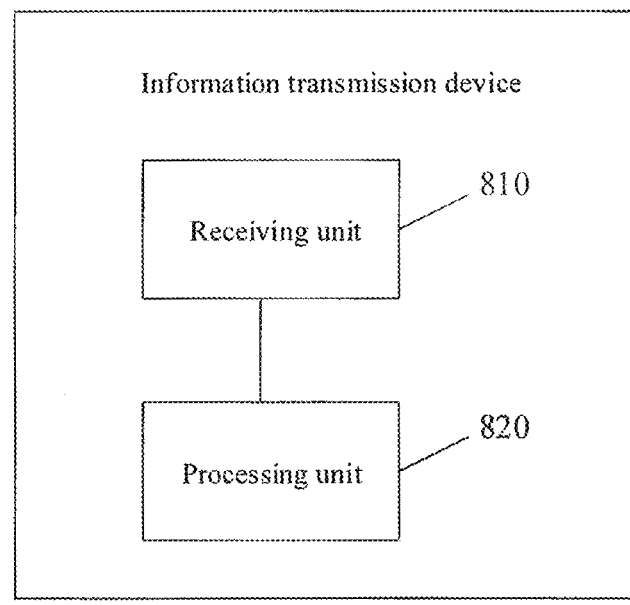
FIG. 11 is a schematic flowchart of a device for transmitting information according to an embodiment of the present disclosure.

FIG. 11 is a schematic block diagram of a device for transmitting information 800 according to an embodiment of the present disclosure. As illustrated in FIG. 11, the device 800 includes a receiving unit 810 and a processing unit 820.

The receiving unit 810 is configured for a receiver to receive first signal via a first symbol, with a first subcarrier spacing, of a first time-frequency region, the first signal being reference signal, and receive second signal via a second symbol, with a second subcarrier spacing, of the first time-frequency region. The second signal is data signal or control signal. The processing unit 820 is configured to process the first signal and the second signal. The first subcarrier spacing is different from the second subcarrier spacing. A size of the first time-frequency region is a size of a minimum time-frequency scheduling unit of data signal or control signal.

Optionally, the processing unit 820 is further configured to use the first signal to demodulate the second signal.

Optionally, the sending unit 810 is further configured to receive the first signal via the first symbol, with the first subcarrier spacing, of the first time-frequency region over a first cell, receive the second signal via the second symbol, with the second subcarrier spacing, of the first time-frequency region over the first cell, receive third signal via a third symbol, with the first subcarrier spacing, of a second time-frequency region over a second cell, the third signal being reference signal, and receive fourth signal via a fourth symbol, with a third subcarrier spacing, of the second time-frequency region over the second cell. The fourth signal is data signal or control signal. The processing unit 820 is configured to process the third signal and the fourth signal. The second subcarrier spacing is different from the third subcarrier spacing and the first cell is different from the second cell. The first time-frequency region and the second time-frequency region have a same time domain, have a same frequency domain, or have adjacent frequency domains. A size of the second time-frequency region is a size of a minimum time-frequency scheduling unit of data signal.

Optionally, the receiving unit 810 is further configured to receive the first signal via the first symbol, with the first subcarrier spacing, of the first time-frequency region over a first cell, receive the second signal via the second symbol, with the second subcarrier spacing, of the first time-frequency region over the first cell, receive fifth signal via a fifth symbol, with the first subcarrier spacing, of a third time-frequency region. Here, the fifth signal is reference signal. The receiving unit 810 is further configured to receive sixth signal via a sixth symbol, with a fourth subcarrier spacing, of the third time-frequency region over the first cell. The sixth signal is data signal or control signal. The processing unit 820 is further configured to process the fifth signal and the sixth signal. The second subcarrier spacing is different from the fourth subcarrier spacing. The first time-frequency region and the third time-frequency region have a same time domain and different frequency domains. A size of the third time-frequency region is a size of a minimum time-frequency scheduling unit of data signal or control signal.

The device 800 may correspond to the receiver in the abovementioned method embodiment, may implement corresponding operations of the receiver and will not be elaborated herein for simplicity.

Figure 12:
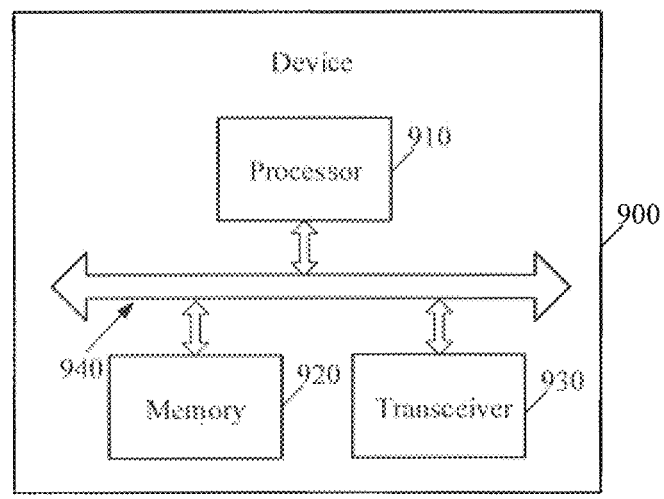
FIG. 12 is a schematic flowchart of a device for transmitting information according to an embodiment of the present disclosure.

FIG. 12 is a schematic block diagram of a device 900 according to an embodiment of the present disclosure. The device 900 includes a processor 910, a memory 920 and a transceiver 930. The memory 920 is configured to store a program instruction. The processor 910 may call the program instruction stored in the memory 920. The transceiver 930 is configured for external communication. Optionally, the device 900 further includes a bus system 940 interconnecting the processor 910, the memory 920 and the transceiver 930.

Optionally, the device 900 may correspond to the sender in the abovementioned method embodiment and is configured to realize corresponding functions of the sender or may correspond to the receiver in the abovementioned method embodiment and is configured to realize corresponding functions of the receiver.

Descriptions will be made below at first with the condition that the device 900 is the sender as an example.

Specifically, the processor 910 is configured to call the instruction stored in the memory 920 to execute the following operations:

transmitting, by using the transceiver 930, first signal via a first symbol, with a first subcarrier spacing, of a first time-frequency region, here, the first signal is reference signal; and transmitting, by using the transceiver 930, second signal via a second symbol, with a second subcarrier spacing, of the first time-frequency region, here, the second signal is data signal or control signal.

The first subcarrier spacing is different from the second subcarrier spacing, and a size of the first time-frequency region is a size of a minimum time-frequency scheduling unit of data signal.

Optionally, the first signal is configured for a receiver to demodulate the second signal.

Optionally, the processor 910 is configured to call the instruction stored in the memory 920 to execute the following operations: transmitting, by using the transceiver 930, the first signal via the first symbol, with the first subcarrier spacing, of the first time-frequency region over a first cell; transmitting, by using the transceiver 930, the second signal via the second symbol, with the second subcarrier spacing, of the first time-frequency region, including: transmitting second signal, by using a first sender, the second signal via the second symbol, with the second subcarrier spacing, of the first time-frequency region; transmitting, by using the transceiver 930, third signal via a third symbol, with the first subcarrier spacing, of a second time-frequency region, the third signal being reference signal; and transmitting, by using the transceiver 930, fourth signal via fourth symbol, with a third subcarrier spacing, of the second time-frequency region. The fourth signal is data signal or control signal. The second subcarrier spacing is different from the third subcarrier spacing. The first cell is different from the second cell. The first time-frequency region and the second time-frequency region have a same time domain and different frequency domains. A size of the second time-frequency region is a size of a minimum time-frequency scheduling unit of data signal.

Optionally, the processor 910 is configured to call the instruction stored in the memory 920 to execute the following operations: transmitting, by using the transceiver 930, the first signal via the first symbol, with a first subcarrier spacing, of the first time-frequency region over a first cell; transmitting, by using the transceiver 930, the second signal via the second symbol, with the second subcarrier spacing, of the first time-frequency region; transmitting, by using the transceiver 930, fifth signal via a fifth symbol, with the first subcarrier spacing, of a third time-frequency region over the first cell, the fifth signal being reference signal; and transmitting, by using the transceiver 930, sixth signal via a sixth symbol, with a fourth subcarrier spacing, of the third time-frequency region. The sixth signal is data signal or control signal. The second subcarrier spacing is different from the third subcarrier spacing. The first time-frequency region and the third time-frequency region have a same time domain and different frequency domains. A size of the third time-frequency region is a size of a minimum time-frequency scheduling unit of data signal.

Optionally, the subcarrier spacing for the data signal is different from the subcarrier spacing for the control signal.

Optionally, the processor 910 is configured to call the instruction stored in the memory 920 to execute the following operation: transmitting, by using the transceiver 930, ninth signal via the first symbol, with the first subcarrier spacing, of the first time-frequency region, the ninth signal being data signal or control signal.

Optionally, the ninth signal and the first signal is arranged alternately on the frequency domain.

Descriptions will be made below at first with the condition that the device 900 is the receiver as an example.

The processor 910 is configured to call the instruction stored in the memory 920 to execute the following operations: receiving, by using the transceiver 930, first signal via a first symbol, with a first subcarrier spacing, of a first time-frequency region, the first signal being reference signal; and receiving, by using the transceiver 930, second signal via a second symbol, with a second subcarrier spacing, of the first time-frequency region. The second signal is data signal or control signal. The first subcarrier spacing is different from the second subcarrier spacing. A size of the first time-frequency region is a size of a minimum time-frequency scheduling unit of data signal or control signal.

Optionally, the processor 910 is configured to call the instruction stored in the memory 920 to execute the following operation: demodulating, by the receiver, the second signal by using the first signal.

Optionally, the processor 910 is configured to call the instruction stored in the memory 920 to execute the following operations: receiving, by using the transceiver 930, the first signal via the first symbol, with the first subcarrier spacing, of the first time-frequency region over a first cell; receiving, by using the transceiver 930, the second signal via the second symbol, with the second subcarrier spacing, of the first time-frequency region over the first cell; receiving, by using the transceiver 930, third signal via a third symbol, with the first subcarrier spacing, of a second time-frequency region over a second cell, the third signal being reference signal; and receiving, by using the transceiver 930, fourth signal via a fourth symbol, with a third subcarrier spacing, of the second time-frequency region over the second cell. The fourth signal is data signal or control signal. The second subcarrier spacing is different from the third subcarrier spacing. The first cell is different from the second cell. The first time-frequency region and the second time-frequency region have a same time domain, have a same frequency domain, or have adjacent frequency domains. A size of the second time-frequency region is a size of a minimum time-frequency scheduling unit of data signal or control signal.

Optionally, the processor 910 is configured to call the instruction stored in the memory 920 to execute the following operations: receiving, by using the transceiver 930, the first signal via the first symbol, with the first subcarrier spacing, of the first time-frequency region over a first cell; receiving, by using the transceiver 930, the second signal via the second symbol, with the second subcarrier spacing, of the first time-frequency region over the first cell; receiving, by using the transceiver 930, fifth signal via a fifth symbol, with the first subcarrier spacing, of a third time-frequency region over the first cell, the fifth signal being reference signal; and receiving, by using the transceiver 930, sixth signal via a sixth symbol, with a fourth subcarrier spacing, of the third time-frequency region over the first cell. The sixth signal is data signal or control signal. The second subcarrier spacing is different from the third subcarrier spacing. The first time-frequency region and the third time-frequency region have a same time domain and different frequency domains. A size of the third time-frequency region is a size of a minimum time-frequency scheduling unit of data signal or control signal.

Those of ordinary skill in the art may realize that the units and algorithm acts of each example described in conjunction with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by using different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the acts of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for information transmission, comprising:
transmitting, by a first sender, a first signal via a first symbol, with a first subcarrier spacing, of a first time-frequency region, the first signal being a reference signal; and
transmitting, by the first sender, a second signal via a second symbol, with a second subcarrier spacing, of the first time-frequency region, the second signal being a control signal, wherein
the first subcarrier spacing is different from the second subcarrier spacing, and a size of the first time-frequency region is a size of a subframe;
transmitting a ninth signal via the first symbol, with the first subcarrier spacing, of the first time-frequency region, the ninth signal being a control signal, wherein the ninth signal and the first signal are arranged alternately on the frequency domain;
transmitting, by the first sender, the first signal via the first symbol, with the first subcarrier spacing, of the first time-frequency region comprises: transmitting, by the first sender, the first signal via the first symbol, with the first subcarrier spacing, of the first time-frequency region over a first cell; and
transmitting, by the first sender, the second signal via the second symbol, with the second subcarrier spacing, of the first time-frequency region comprises: transmitting, by the first sender, the second signal via the second symbol, with the second subcarrier spacing, of the first time-frequency region over the first cell,
wherein the method further comprises: transmitting, by the first sender, a third signal via a third symbol, with the first subcarrier spacing, of a second time-frequency region over a second cell, the third signal being a reference signal, and transmitting, by the first sender, a fourth signal via a fourth symbol, with a third subcarrier spacing, of the second time-frequency region over the second cell, the fourth signal being data signal or control signal,
wherein the second subcarrier spacing is different from the third subcarrier spacing, and the first cell is different from the second cell;
the first time-frequency region and the second time-frequency region have a same time domain and have a same frequency domain or adjacent frequency domains; and a size of the second time-frequency region is the size of the subframe.

2. The method of claim 1, wherein the first signal is configured for a receiver to demodulate the second signal.

3. The method of claim 1, wherein
transmitting, by the first sender, the first signal via the first symbol, with the first subcarrier spacing, of the first time-frequency region comprises: transmitting, by the first sender, the first signal via the first symbol, with the first subcarrier spacing, of the first time-frequency region over a first cell; and
transmitting, by the first sender, the second signal via the second symbol, with the second subcarrier spacing, of the first time-frequency region comprises: transmitting, by the first sender, the second signal via the second symbol, with the second subcarrier spacing, of the first time-frequency region over the first cell,
wherein the method further comprises:
transmitting, by the first sender, a fifth signal via a fifth symbol, with the first subcarrier spacing, of a third time-frequency region over the first cell, the fifth signal being a reference signal, and
transmitting, by the first sender, a sixth signal via a sixth symbol, with a fourth subcarrier spacing, of the third time-frequency region over the first cell, the sixth signal being a data signal or a control signal,
wherein the second subcarrier spacing is different from the fourth subcarrier spacing;
the first time-frequency region and the third time-frequency region have a same time domain and different frequency domains; and a size of the third time-frequency region is the size of the subframe.

4. The method of claim 1, further comprising:
transmitting, by a second sender, a seventh signal via a seventh symbol, with the first subcarrier spacing, of a fourth time-frequency region, the seventh signal being a reference signal; and
transmitting, by the second sender, eighth signal via an eighth symbol, with a fifth subcarrier spacing, of the fourth time-frequency region, the eighth signal being a data signal or a control signal,
wherein the first subcarrier spacing is different from the fifth subcarrier spacing;
the first time-frequency region and the fourth time-frequency region have a same time domain; the first time-frequency region and the fourth time-frequency region have a same time domain, or have a same frequency domain or adjacent frequency domains, or the first sender and the second sender are located in a same cell; and a size of the fourth time-frequency region is a size of a minimum time-frequency scheduling unit of a data signal or a control signal.

5. A method for information transmission, comprising:
receiving, by a receiver, a first signal via a first symbol, with a first subcarrier spacing, of a first time-frequency region, the first signal being a reference signal; and
receiving, by the receiver, a second signal via a second symbol, with a second subcarrier spacing, of the first time-frequency region, the second signal being a control signal, wherein
the first subcarrier spacing is different from the second subcarrier spacing, and a size of the first time-frequency region is a size of a subframe;
receiving a ninth signal via the first symbol, with the first subcarrier spacing, of the first time-frequency region, the ninth signal being a control signal, wherein the ninth signal and the first signal are arranged alternately on the frequency domain;
receiving, by the receiver, the first signal via the first symbol, with the first subcarrier spacing, of the first time-frequency region comprises: receiving, by the receiver, the first signal via the first symbol, with the first subcarrier spacing, of the first time-frequency region over a first cell; and
receiving, by the receiver, the second signal via the second symbol, with the second subcarrier spacing, of the first time-frequency region comprises: receiving, by the receiver, the second signal via the second symbol, with the second subcarrier spacing, of the first time-frequency region over the first cell,
wherein the method further comprises: receiving, by the receiver, a third signal via a third symbol, with the first subcarrier spacing, of a second time-frequency region over a second cell, the third signal being a reference signal, and receiving, by the receiver, fourth signal via a fourth symbol, with a third subcarrier spacing, of the second time-frequency region over the second cell, the fourth signal being a data signal or a control signal,
wherein the second subcarrier spacing is different from the third subcarrier spacing, and the first cell is different from the second cell;
the first time-frequency region and the second time-frequency region have a same time domain, have a same frequency domain, or have adjacent frequency domains; and a size of the second time-frequency region is the size of the subframe.

6. The method of claim 5, further comprising:
demodulating, by the receiver, the second signal by using the first signal.

7. The method of claim 5, wherein
receiving, by the receiver, the first signal via the first symbol, with the first subcarrier spacing, of the first time-frequency region comprises: receiving, by the receiver, the first signal via the first symbol, with the first subcarrier spacing, of the first time-frequency region over a first cell; and
receiving, by the receiver, the second signal via the second symbol, with the second subcarrier spacing, of the first time-frequency region comprises: receiving, by the receiver, the second signal via the second symbol, with the second subcarrier spacing, of the first time-frequency region over the first cell, wherein
the method further comprises:
receiving, by the receiver, a fifth signal via a fifth symbol, with the first subcarrier spacing, of a third time-frequency region over the first cell, the fifth signal being a reference signal, and
receiving, by the receiver, a sixth signal via a sixth symbol, with a fourth subcarrier spacing, of the third time-frequency region over the first cell, the sixth signal being a data signal or a control signal,
wherein the second subcarrier spacing is different from the fourth subcarrier spacing;
the first time-frequency region and the third time-frequency region have a same time domain and different frequency domains; and a size of the third time-frequency region is the size of the subframe.

8. A device for information transmission, comprising: a processor, a memory and a transceiver, the memory is configured to store program instructions, when the program instruction stored in the memory are executed by the processor, the processor is configured to:
acquire a first signal and second signal, the first signal being a reference signal and the second signal being a control signal; and
control the transceiver to transmit the first signal via a first symbol, with a first subcarrier spacing, of a first time-frequency region and transmit the second signal via a second symbol, with a second subcarrier spacing, of the first time-frequency region, wherein
the first subcarrier spacing is different from the second subcarrier spacing, and a size of the first time-frequency region is a size of a subframe;
the processor is further configured to acquire a ninth signal, the ninth signal being a control signal; and
the processor is further configured to:
control the transceiver to transmit the ninth signal via the first symbol, with the first subcarrier spacing, of the first time-frequency region, wherein the ninth signal and the first signal are arranged alternately on the frequency domain;
wherein the processor is further configured to acquire a third signal and a fourth signal, the third signal being a reference signal and the fourth signal being a data signal or a control signal; and
the processor is further configured to:
control the transceiver to transmit the first signal via the first symbol, with the first subcarrier spacing, of the first time-frequency region over a first cell,
control the transceiver to transmit the second signal via the second symbol, with the second subcarrier spacing, of the first time-frequency region over the first cell,
control the transceiver to transmit the third signal via a third symbol, with the first subcarrier spacing, of a second time-frequency region over a second cell, and control the transceiver to transmit the fourth signal via a fourth symbol, with a third subcarrier spacing, of the second time-frequency domain over the second cell, wherein the second subcarrier spacing is different from the third subcarrier spacing, and the first cell is different from the second cell;

the first time-frequency region and the second time-frequency region have a same time domain, have a same frequency domain, or have adjacent frequency domains; and a size of the second time-frequency region is the size of the subframe.

9. The device of claim 8, wherein the first signal is configured for a receiver to demodulate the second signal.

10. The device of claim 8, wherein the processor is further configured to acquire a fifth signal and a sixth signal, the fifth signal being a reference signal and the sixth signal being a data signal or a control signal; and the processor is further configured to:

control the transceiver to transmit the first signal via the first symbol, with the first subcarrier spacing, of the first time-frequency region over a first cell, control the transceiver to transmit the second signal via the second symbol, with the second subcarrier spacing, of the first time-frequency region over the first cell, control the transceiver to transmit the fifth signal via a fifth symbol, with the first subcarrier spacing, of a third time-frequency region over the first cell; and control the transceiver to transmit the sixth signal via a sixth symbol, with a fourth subcarrier spacing, of the third time-frequency region over the first cell, wherein the second subcarrier spacing is different from the fourth subcarrier spacing;

the first time-frequency region and the third time-frequency region have a same time domain and different frequency domains; and a size of the third time-frequency region is the size of the subframe of data signal.

11. The method of claim 2, wherein transmitting, by the first sender, the first signal via the first symbol, with the first subcarrier spacing, of the first time-frequency region comprises: transmitting, by the first sender, the first signal via the first symbol, with the first subcarrier spacing, of the first time-frequency region over a first cell; and transmitting, by the first sender, the second signal via the second symbol, with the second subcarrier spacing, of the first time-frequency region comprises: transmitting, by the first sender, the second signal via the second symbol, with the second subcarrier spacing, of the first time-frequency region over the first cell, wherein the method further comprises:

transmitting, by the first sender, a fifth signal via a fifth symbol, with a first subcarrier spacing, of the third time-frequency region over the first cell, the fifth signal being a reference signal, and transmitting, by the first sender, a sixth signal via a sixth symbol, with a fourth subcarrier spacing, of the third time-frequency region over the first cell, the sixth signal being a data signal or a control signal, wherein the second subcarrier spacing is different from the fourth subcarrier spacing;

the first time-frequency region and the third time-frequency region have a same time domain and different frequency domains; and a size of the third time-frequency region is the size of the subframe.

* * * * *